(12) United States Patent
Lethe

(10) Patent No.: US 7,712,131 B1
(45) Date of Patent: May 4, 2010

(54) METHOD AND APPARATUS FOR STORAGE AND USE OF DIAGNOSTIC SOFTWARE USING REMOVEABLE SECURE SOLID-STATE MEMORY

(76) Inventor: David Lethe, 3133 Freedom La., Plano, TX (US) 75025

( * ) Notice: Subject to any disclaimer, the term of this patent is extended or adjusted under 35 U.S.C. 154(b) by 916 days.

(21) Appl. No.: 11/054,224

(22) Filed: Feb. 9, 2005

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)

(52) U.S. Cl. .............................. 726/20; 726/9; 713/150; 713/185; 713/189; 701/29

(58) Field of Classification Search .................. 713/150, 713/189, 185; 726/20, 9; 701/29
See application file for complete search history.

(56) References Cited

U.S. PATENT DOCUMENTS

| | | | | |
|---|---|---|---|---|
| 5,951,687 | A * | 9/1999 | Chan et al. ...................... | 713/2 |
| 6,038,320 | A * | 3/2000 | Miller ........................... | 380/44 |
| 6,061,799 | A * | 5/2000 | Eldridge et al. ................ | 726/20 |
| 6,654,707 | B2 * | 11/2003 | Wynn et al. ................... | 702/186 |
| 6,676,018 | B1 * | 1/2004 | Trelawney et al. ........... | 235/381 |
| 6,697,944 | B1 | 2/2004 | Jones et al. | |
| 7,039,759 | B2 * | 5/2006 | Cheng et al. ................. | 711/115 |
| 7,050,892 | B1 * | 5/2006 | Liebl et al. ..................... | 701/29 |
| 7,111,292 | B2 * | 9/2006 | Bonnett et al. ............... | 717/171 |
| 7,269,258 | B2 * | 9/2007 | Ishihara et al. ............... | 380/263 |
| 7,434,251 | B2 * | 10/2008 | Ooi et al. ......................... | 726/9 |
| 2003/0046568 | A1 | 3/2003 | Riddick et al. | |
| 2003/0210231 | A1 | 11/2003 | Hsu | |
| 2003/0217254 | A1 | 11/2003 | Page et al. | |
| 2004/0003262 | A1 | 1/2004 | England et al. | |
| 2004/0250087 | A1 | 12/2004 | Ray et al. | |
| 2005/0060398 | A1 * | 3/2005 | Owhadi et al. ............... | 709/223 |
| 2005/0081198 | A1 * | 4/2005 | Cho et al. ..................... | 717/174 |
| 2005/0097541 | A1 | 5/2005 | Holland | |
| 2005/0278147 | A1 * | 12/2005 | Morton et al. ............... | 702/183 |

* cited by examiner

*Primary Examiner*—Edan Orgad
*Assistant Examiner*—Karl L Schmidt
(74) *Attorney, Agent, or Firm*—Carr LLP

(57) ABSTRACT

A method, an apparatus, and a computer program are provided to secure diagnostic software from a software or hardware manufacturer for a computer. Traditionally, diagnostic software was distributed to professionals and other personnel in limited numbers. However, it was still possible to obtain unauthorized copies of the diagnostic software. Therefore, to alleviate the possibility of having unauthorized copies, a Universal Serial Bus (USB) memory device containing identification number can be used and a hidden partition that is inaccessible by an end-user where an encrypted version of the identification number is stored. In order to use diagnostic software, the specific USB memory device must be physically interfacing a computer. Hence, by limiting the number of USB memory devices, unauthorized copies can be prevented.

18 Claims, 6 Drawing Sheets

METHOD AND APPARATUS FOR STORAGE AND USE OF DIAGNOSTIC SOFTWARE USING REMOVEABLE SECURE SOLID-STATE MEMORY

FIELD OF THE INVENTION

The present invention relates generally to the area of computer diagnostics, and relates specifically to a system for invoking storage-related diagnostic software and functions that are loaded and authenticated via a factory-serialized solid-state memory device, such as a secure USB flash memory device.

BACKGROUND OF THE INVENTION

There is often a need to run diagnostic software on the hardware and software components of computer systems owned by or in the custody of end-users. Typically, computer system manufacturers ship their hardware and/or software with a limited subset of diagnostic software programs which provides rudimentary information. If this rudimentary information indicates the need for further attention, an expert technician may run additional tests or invoke recovery processes using advanced diagnostic software that should best be run by experts.

Advanced diagnostic software typically represents significant intellectual property to the diagnostic software provider. For various reasons, it is important that this software not be allowed to become copied or run without authorization. Some reasons for this include:

The advanced diagnostic software may "unlock" additional features of the computer system which are normally charged for by the computer hardware or software vendor or the advanced diagnostic software may be used to circumvent licensing restrictions.

Installation and configuration of the advanced diagnostic software may be beyond the scope of the abilities of the end-user.

The advanced diagnostic software could be used to change vendor and/or product identification data which would allow somebody to re-brand a device and create a grey market or counterfeit product.

The advanced diagnostic software, if improperly run, could result in destruction of data or change performance characteristics of the computer system.

Unlike floppy disks and tapes, many operating systems (Microsoft Windows family, LINUX, and Apple OSX) automatically recognize and mount USB memory as removable hard disks and/or CD-ROM devices. There is also a common file system and data format, so the same device can work on multiple operating systems, without the need for reformatting.

The advanced diagnostic software may be licensed for use on only a single host computer system. In this case, the user's technicians will be authorized to run the diagnostic software only in a limited scope and/or for a temporary period of time. However, the provider of the advanced diagnostic software does not want to risk the user making unauthorized copies.

Sometimes diagnostic software is built into a large and expensive hardware component such as a fibre channel analyzer or a more advanced switch that is not available on-site. In this event, an engineer has to acquire and transport the hardware component to the end-user site. Because USB solid-state memory is small and inexpensive, transporting a USB memory through airport security or customs is significantly less stressful and time-consuming consuming then dealing with a large and valuable piece of equipment that might have otherwise need be checked as baggage or shipped overnight at high cost and high risk of damage. Furthermore, while such analyzer equipment may have imbedded software and ability to record diagnostic reports for a limited set of devices, the USB solid-state memory diagnostic software device of the present invention, is more flexible because it can store diagnostic software for virtually any system, can change the set of diagnostic software that it employs to gain the ability to diagnose new and different systems, is a more convenient means of introducing diagnostic software to diagnose the customers' equipment at the customer's site, and is less likely to be lost, stolen, or damaged in transport.

Where the computer system to be diagnosed was sold to an end user by a reseller or agent, the computer system may often be maintained and supported by technicians of the reseller or agent who are unconnected to the provider of the advanced diagnostic software. In this case, a technician of the reseller or agent may be authorized to use one copy the provider's advanced diagnostic software to support and maintain one end user's computer system in a limited manner. Unfortunately, however, there is a great incentive on the part of these technicians to wrongfully make unauthorized copies of the advanced diagnostic software and/or to wrongfully leave copies of the advanced diagnostic software resident on the end user's computer system, without receiving proper authorization from the provider of the diagnostic software. Because these technicians are highly trained computer experts, they are often able to defeat common devices intended to prevent unauthorized copying and/or use of software.

Prior efforts to prevent unauthorized copying and use of other types of software are not generally effective for preventing unauthorized copying and use of advanced diagnostic software. For example, "dongle" devices that contain an authentication code and are physically attached to a port in order to use a software product still require the software to be loaded onto the end user's computer system in order to allow the software to run. Expert computer users are generally able to defeat the anti-copying features of such dongle devices by "tricking" the computer system into "thinking" that the proper dongle device is attached.

Use of a CD-ROM to store the advanced diagnostic software is also not a satisfactory solution, because expert computer users can simply copy a CD-ROM bit-for-bit. Also, the data resulting from the diagnosis cannot be written to the CD-ROM, which makes use of the diagnostic software less convenient.

Use of a writable CD or floppy disk to store the advanced diagnostic software is also not a complete solution. Even if the writable CD or floppy disk is serialized and password-protected, an expert computer user can perform a bit-for-bit copy of the CD or floppy disk and can determine the serial number and passwords to defeat the protections against unauthorized use.

Therefore, there is a need for a method and/or apparatus for securing diagnostic software that addresses at least some of the problems associated with conventional methods and apparatuses for securing software.

SUMMARY OF THE INVENTION

In another embodiment, the invention provides a single durable device which has a read-only CD-ROM emulated partition in which the diagnostic programs are loaded; a hidden encrypted partition to hide and protect 3rd-party software and data; a factory burned-in and unchangeable unique serial number and vendor identification information; and a read/ write partition which can be used to store customer information including identification information, event logs and/or configuration structures, as well as any information deemed useful to the engineer who uses the invention.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
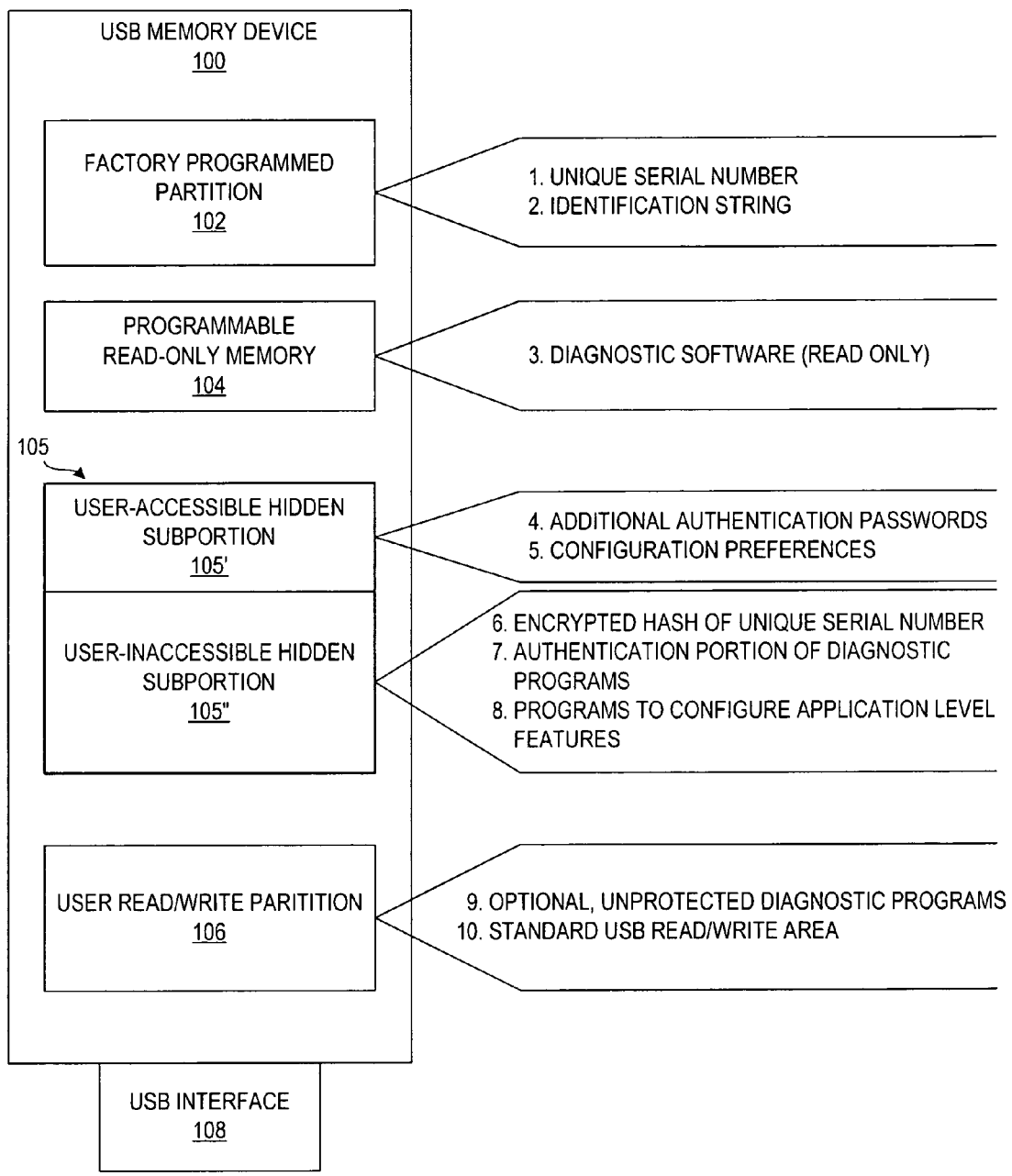
FIG. 1 is a block diagram depicting a secure Universal Serial Bus (USB) memory device that employs secured diagnostic software.

Referring to FIG. 1 of the drawings, the reference numeral 100 generally designates a secure USB memory device that can be used to store and enable operation of diagnostic software. The USB memory device 100 comprises solid-state memory partitioned into a factory-programmed memory partition 102 containing factory burned-in serial number and vendor identification data which cannot be altered by the end-user, a read-only memory (ROM) partition 104 that can store diagnostic software that generally is required to authenticate against data that resides on factory-programmed memory partition 102 and one or more sub-portions of hidden partition 105, which can include encrypted authentication data, a user read/write partition 106, and a USB interface 108.

Partition 105 represents a protected and hidden area of the USB device that is only accessible via specialized commands that are known only to the USB Manufacturer and their OEMs (under strict non-disclosure agreements) who would productize a device such as the one described in this document. The data is this partition is encrypted and will be read by programs that reside on the USB device. Partition 105 can be further partitioned by the diagnostic software provider into an end-user readable and writable sub-portion 105' (under strict program control) and a sub-portion 105" that not readable or writable by an end-user. As used herein, the term "end-user" refers to a person, such as an engineer, other than the manufacturer of the solid-state memory device or an OEM authorized by the manufacturer to know and use the specialized commands needed to access the sub-partition 105".

The diagnostic software provider can make sub-portion 105' readable and/or writable by an end-user under strict program control for purposes of setting configuration preferences, adding additional authentication keys and passwords, maintain running counts of the total time or instances that certain diagnostic software was launched, or just facilitating a general-use protected area so the engineers may hide their own programs that might not require authentication.

It should be noted that the encrypting of the authentication data in sub-portion 105" of partition 105, including user encryption keys known only to the diagnostic software provider, in additional to "hiding" the data, guards against the possibility that the manufacturer of the USB device or one of its other OEMs inadvertently releases software which would facilitate accessing the raw data from outside the protection of the software described in this document by an end-user.

Sub-portion 105' of partition 105 contains device-specific configuration settings, such as passwords, license keys, public/private encryption keys and general configurable defaults. In addition, it may contain a private area that the diagnostic engineer can read/write files to under control of the diagnostic software. Typical use for this would be to load and protect 3rd-party applications and data files. By copying them into the hidden partition they will have the highest degree of protection.

The USB interface 108 allows the USB memory device to interact with a computer or other device having a USB port. When connected to a computer, both power for the USB memory device 100 and data transmission channels are provided through interface 108. Typically, these USB interfaces 108 support an approximately 12 Mbps data transfer rate.

USB devices compatible with the USB 2.0 specification can support data transfer rates up to 480 Mbps. This invention is not tied to a specific generation level of the USB interface, and is designed to be compatible with later revisions of the USB interface specification.

The factory programmed partition 102 stores factory-supplied and unchangeable information unique to the specific USB device. In particular, partition 102 stores a unique serial number associated with the specific device 100, and an identification string that identifies the product and/or vendor. Thus, no two otherwise identical USB devices 100, even the same model number from the same vendor, will have both the same serial number and the same vendor and/or product identification string. These numbers are in areas of the USB memory that are not alterable after manufacture of the USB device.

The secure USB device in this embodiment of the invention is to be distinguished from conventional USB flash memory devices, which have mass-produced serial number information. With these USB devices, the serial number is zero, blank or several of the same model device from a particular vendor have the same number. Thus, these USB devices often are functionally identical and cannot be distinguished from one another by a mass storage device, such as a hard drive, or by a computing device. It is not practical to bind application software requiring security measures to this type of device since there is no unique hardware-protected identification information to tie program images to.

The ROM 104 on the USB memory device 100 is accessible for writing by the provider of the diagnostic software to be secured with appropriate commands available only to OEM's of the USB manufacturer under strict non-disclosure agreements and with the correct password as determined by the diagnostic software provider. ROM 104 can be pre-programmed by the diagnostic software provider to store an encrypted hash of the unique serial number and/or an encrypted hash of the vendor identification string(s). The diagnostic software (in Read-only format) and/or programs to configure applications-level features can also be stored in ROM 104. The contents of ROM 104 can be modified by the provider of the diagnostic software through proprietary software designed specifically to read/write this partition. Documentation for accessing this partition is available only to OEM's of the USB manufacturer under strict non-disclosure agreements. Furthermore, OEMs may have different firmware revisions imbedded in the USB device which make the commands unique to a particular OEM. Management software for the USB device will be installed in ROM 104, and access to certain functions of this software is controlled via configuration settings and passwords located in partition 105.

By using a USB flash device that has unique serial number and identification information in non-volatile, non-changeable memory areas, and other encryption software in sub-portion 105" of hidden partition 105, to hide and protect licensing information for the software that will be loaded on the invention, it is possible to practically secure the diagnostic software from unauthorized copying. The serial number information as well as vendor/product data is permanently burned into the USB device and cannot be altered by customers, much like the serial number of a computer's CPU chip is burned in at the factory and can not be changed. That way, one can not merely buy another off-the-shelf USB flash memory device and clone the software.

By adding encrypted data, configuration parameters and passwords which are stored in partitions 104-106, as well as data from the computer host that the USB is attached (such as the current date), then the USB device is even protected against a situation where another OEM partner of the USB manufacturer utilizes the proprietary commands (known to it under strict non-disclosure agreements) in an attempt to make a working copy of the USB device and circumvent traditional protection techniques. Even is such an OEM partner figures out how to access the hidden partition, they would still have to defeat the encryption logic as it is based, in part, on the unique serial number burned into partition 102. Thus, even if the encrypted password scheme was cracked (which is highly unlikely), the encrypted password scheme would only work to permit use of the one specific unit of the USB memory device. However, making a functional copy of the diagnostic software from the USB memory device would still be impossible.

The user partition 106 may contain data that need not be secured and that can be easily erased or changed. Such data may include, for example, non-proprietary or less advanced diagnostic software that need not be secured, as well as host-computer-specific or customer-specific data, such as customer or host-computer identification information, configuration information, error logs resulting from the diagnosis, and/or other support information. Although this read/write area may be unencrypted, the diagnostic software program may also include a routine for encrypting or otherwise securing (such as by password protection) some or all of the data written to this area so that it cannot be accidentally or deliberately viewed or altered by unauthorized persons.

In order to prevent the engineer from having to "install" program files on the host that will run the diagnostics, the diagnostic software will ideally use read/write areas of the USB device for temporary data as well as event logs. This is not a hard requirement, however, and more of an implementation note. In the case of a remote diagnostic session, then log files would usually be sent to the authentication computer (FIG. 2B).

The USB memory device 100 can be configured to operate across multiple platforms, such as Windows® (Microsoft Corp., One Microsoft Way, Redmond Wash. 98052-6399) and UNIX® (UNIXSYSTEM LABORATORIES, Inc., 295 North Maple Ave., Basking Ridge, N.J. 07920). In this case, versions of the diagnostic software for each of the multiple operating systems can be stored on the secure USB device.

In one embodiment, partition 104 is configured to present itself as a CD-ROM disk to the host computer. This is desirable because the data layout of CD-ROMs is common across multiple operating systems. Thus, once the device is plugged in, the host computer will be able to access all of the files in the partition and no reformatting or conversion is necessary. This design is of great benefit to the engineer as this means the engineer need carry only one device which is usable by multiple operating systems, rather than purchasing units specifically formatted for LINUX, Windows, Apple OS X, and other operating systems with native USB memory stick support.

Figure 2A:
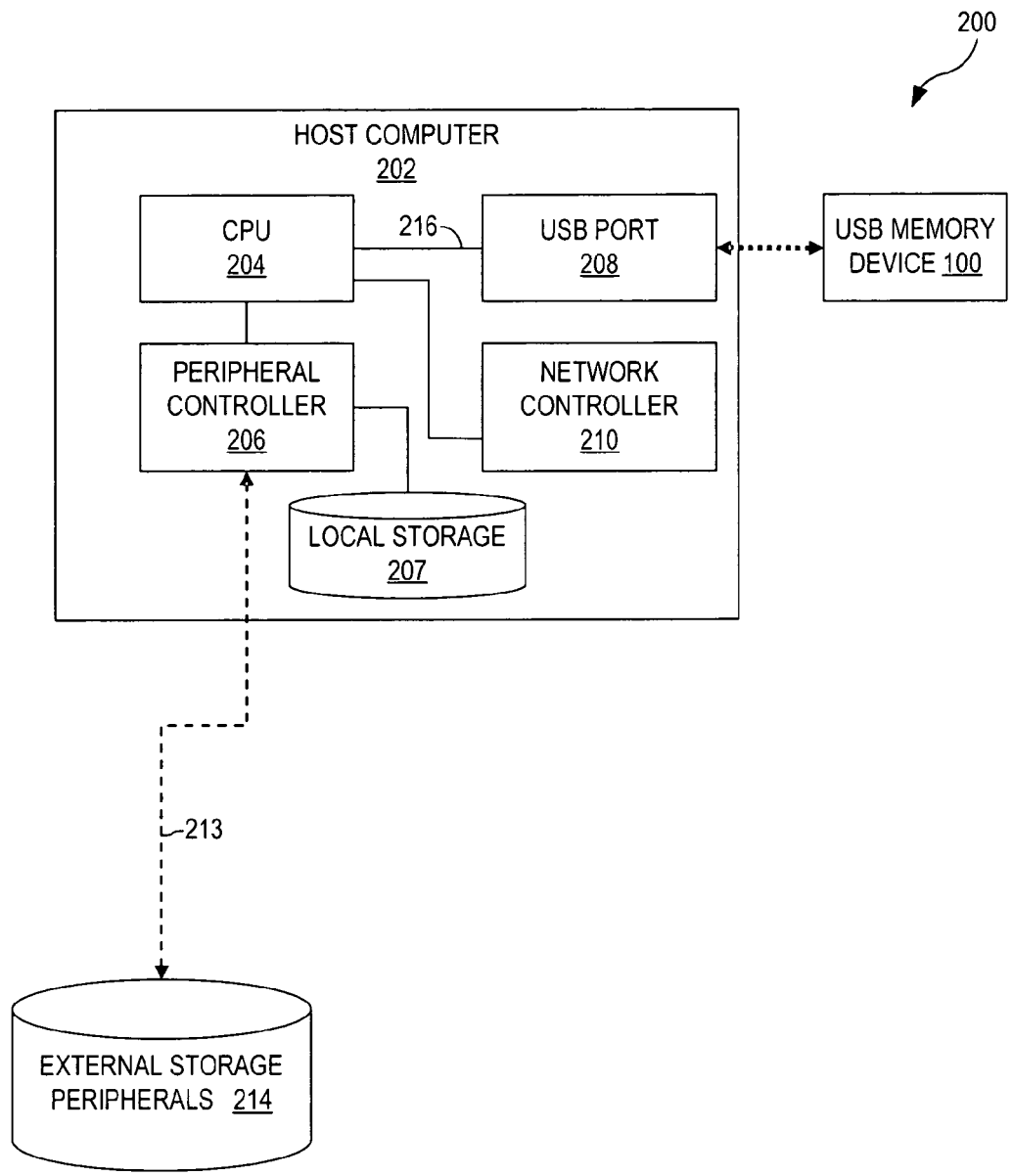
FIG. 2A is a block diagram depicting a host computer system to be diagnosed that employs the secure USB memory device connected to a USB port of the host computer.
Figure 2B:
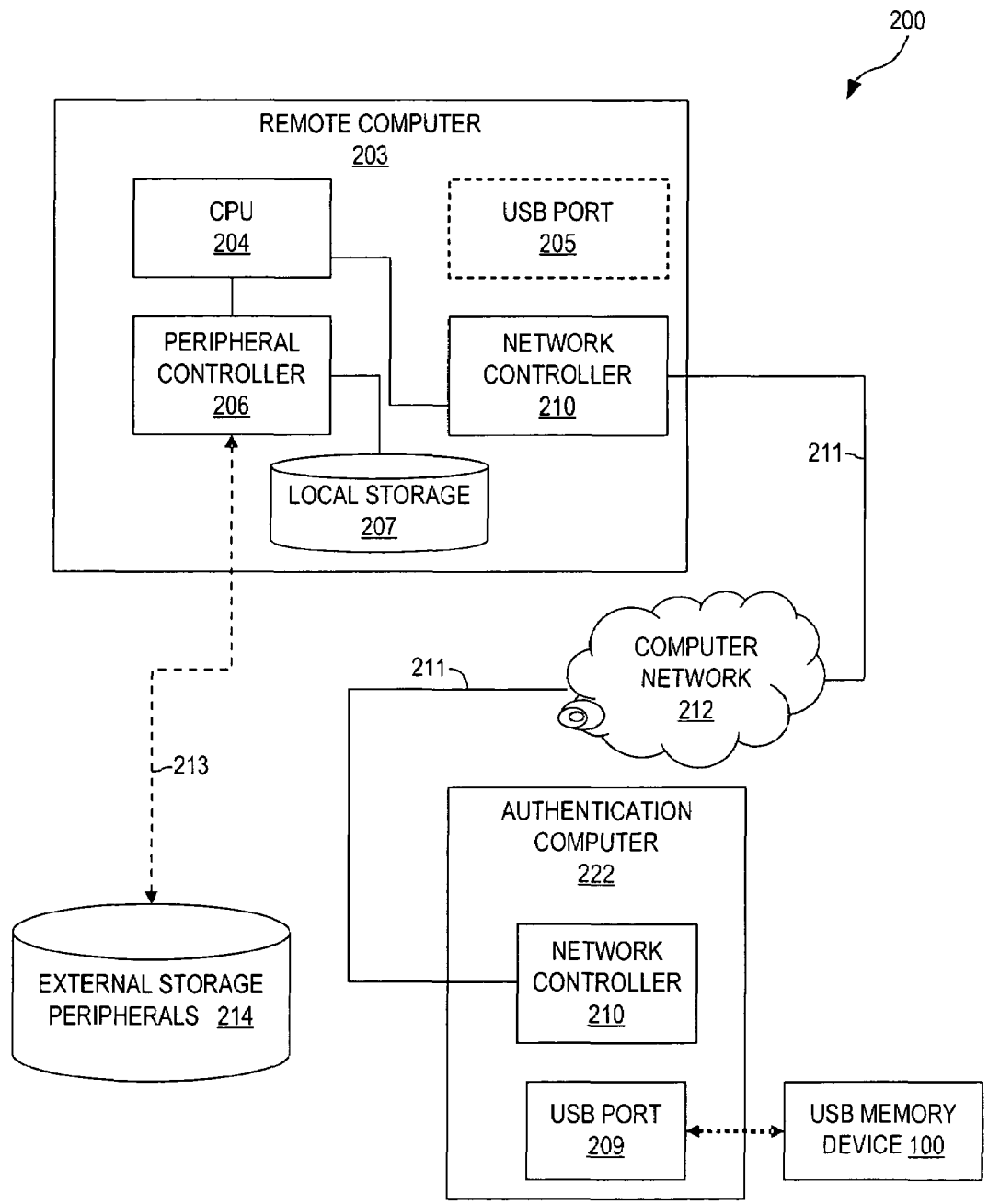
FIG. 2B is a block diagram depicting a remote computer system to be diagnosed that employs the secure USB memory device connected to an authentication computer that is in communication with the remote computer via a computer network.

Referring to FIG. 2A of the drawings, the reference numeral 200 generally designates a computer system 200 comprising a host computer 202 and a USB memory device 100.

In operation, the USB memory device 100 interfaces with the host computer 202 to allow for employment of the secured diagnostic software. The USB memory device 100 connects to the USB port 208 so that the USB memory device 100 can be powered and information can be transferred to and from the port and, from there, relayed to the Central Processing Unit (CPU) 204 of the host computer through its communication channel 216.

In operation, the host computer runs an application program that resides on ROM 104 which includes at least an authentication program. The authentication program reads the serial number and vendor identification strings in factory partition 102, the encrypted serial number and other protection-related fields in partition 104 which may be either device-specific, or program-specific settings, then it utilizes the "special" commands available only to OEM's to attempt to read from the hidden partition. The hidden partition will contain additional encrypted serial number signatures, configurable settings such as master password which must be entered at the time the program is launched (should everything else check out OK), along with more encryption/security-related fields that protect against a more sophisticated pirating scheme that involves emulating a USB device in software and using a cloned image of the visible partitions and serial number.

Partition 102 is user-accessible for reading only. The mechanism for accessing some of this data is not generally known to end-users, but this information can be viewed using specialty programs, low-level diagnostics, or writing code that is defined per ANSI specifications.

Partition 104 is user accessible. In one embodiment, partition 104 appears as a CDROM because this format is common to all major operating systems, so programs can go here for any/all operating systems. Thus, only a simple directory tree for each O/S and program and one copy of the documentation is required. Having it emulate a CDROM is desirable for the invention because, with it, as engineer does not have to have separate USB stick for every operating system.

The programs on 104 generally are coded to utilize an authentication program which accesses the other partitions that are described above. The partition may also include programs that can be used to protect 3rd-party programs that the end-user (or their company wants to load onto partition 106. Those programs would be anything from tutorials, firmware images, in-house diagnostics. This partition may also include unprotected software.

Hidden partition 105 is divided into two sub-portions, a sub-portion 105" that can only be accessed by the diagnostic provider for either reading or writing using proprietary commands only available to OEM's in addition to appropriate passwords determined by the diagnostic software provider. Data in sub-portion 105" is also encrypted. Sub-portion 105" contains things like software activation keys, configuration settings (i.e, who the USB memory device is registered to, limitations on which functions will be enabled for a particular customer, i.e., whether customer is permitted to run diagnostic program or function #73, and whether a password will be required when it is launched to insure that if somebody loses or steals the USB stick that they won't be able to run the program. Sub-portion 105" is Read/Write, but is only writable only through a management/configuration/setup program requiring special commands available only to OEM's, as well as being password protected, insures that an emulated USB memory device as described herein cannot be cracked without getting past emulating the proper responses to commands that access this area, which will not be possible for persons other than the diagnostic software provider.

Partition 106 is generally used for scratch data. The read/write portion of partition 106 can, however, be formatted like a hard drives (which is what is emulated), which have file system formats that differ between operating systems. Accordingly, partition 106 may have to be reformatted depending on the partition format type currently on there, and the type native to the operating system that the USB memory device is used on.

Partition 106 can also contain any other software packages that might be in the engineer's bag-o-tricks (other than the diagnostic software provider's secured advanced diagnostic software described herein).

It should be noted that, since in one embodiment USB memory device is used, a naive user might try to copy a program from ROM partition 104 onto local hard drive to steal it. They can copy the program, but the authentication programs which are incorporated into the diagnostic software of the present invention, when launched, are going to look for the specific USB memory stick attached to the computer, then go into authentication mode.

It should also be noted that the programs never have to be executed directly from the CDROM emulated partition. I.e, D:\ being the CDROM partition 104. Rather, a user could copy program for convenience onto C:\ and run it there. The programs might also be too large to fit on the CDROM partition, so some of them might be saved in a zipped or compressed format on the CDROM partition.

Figure 3A:
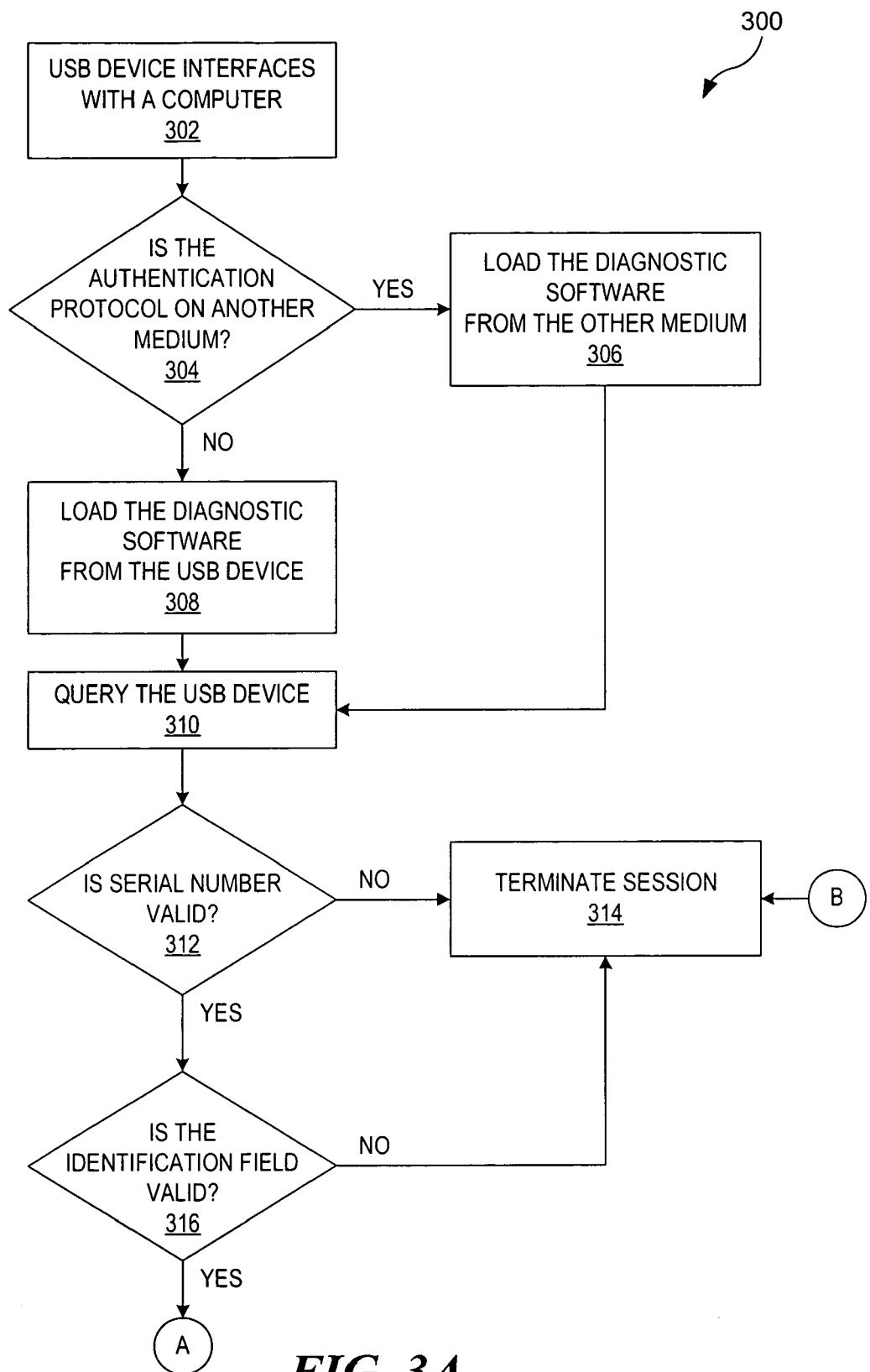
FIGS. 3A and 3B depict a flow chart of the operation of the secure USB device to enable loading and running of the diagnostic software with the configuration of FIG. 1.

FIGS. 2A and 2B represent the two possible topologies which the USB device can use to deploy the diagnostic software to the target computers. FIG. 2A represents a situation where the host computer 202 has a local USB port 208 that is compatible with USB memory devices 100, and the engineer wishes to diagnose internal 207 and/or external 214 peripherals. Both peripherals are connected to one or more controllers 206, such as SCSI or fibre channel, in the host computer 202 via an interconnect 213 such as a SCSI cable. This storage interconnect may also represent a connection to a group of devices such as peripherals attached to a storage area network. The process illustrated by FIG. 3A illustrates the authentication mechanism that is generally auto-launched immediately after the USB memory stick is attached to the host.

FIG. 2B represents the situation where diagnostics must be run on a remote computer 203. This remote computer would typically run an operating system that does not have USB support. Even if the remote computer had a USB port 205, then it may still be inconvenient or impractical to attach the USB device 100 to it. In this situation, a computer that has a USB port serves as an authentication computer 222. These two computers establish and authenticate a connection (FIG. 4) over a network interface 212 between them. This provides a mechanism for the remote computer to access the USB memory for purposes of obtaining and executing the authentication programs and their corresponding data structures in the USB device. Once the software is authenticated, then diagnostics will run on the remote computer, which, in turn, will provide information about the peripherals 207 and 214 attached to it.

As depicted in FIG. 2B, the computer network 212 can by any type of network including, but not limited to, a LAN, a WAN, or the Internet.

Note also that the links between the remote computer 203, network cabling (or wireless) connection 211, network 212, 211, and authentication computer's 222 network controller 210 and process (FIG. 4) serve as a remote interconnect. This allows the diagnostic software running on the remote computer to interact with the USB memory plugged into the authentication computer as a substitute for the direct connect model that is shown in FIG. 2A.

A typical remote authentication situation is when an engineer is dispatched to a customer site, and the engineer plugs his USB memory device 100 into a laptop or a customer's computer (that is networked to the remote computer) in order to run diagnostics on a system that doesn't have USB support.

This process and hardware connection allows the user to have the flexibility to run the diagnostic software on any supported host or remote system, but still prevents the software from running on unlicensed systems.

By insuring that the diagnostic software polls the authentication computer at a pre-established interval, and setting an optional start-up delay, then the engineer can securely define the start and end time for a suite of programs. This allows programs to run and resulting log files to be recorded long after the engineer has left, or if he/she is on a lunch break and can't insure that the system isn't going to be remotely accessed with the intent of pirating a copy of the software. The engineer is free to leave his proprietary software running knowing that it will terminate at the desired time, and if customer copied the program files without authorization, that they would abort when they were run because the programs would be looking for a certain USB stick.

As the USB memory device presents itself to computers as CDROM devices ROM 104, then it is common, and in some cases, desirable, that a user will copy the diagnostic software from that partition and/or partition 106 to the local disk 207 attached to the computer(s) that need to run the software. Once the software is launched and authenticated, then an engineer is free to unplug the USB memory device and, if the diagnostic software allows it, to repeat the process with another computer. Ideally, the diagnostic software will incorporate a polling/re-authentication process to constrain the number of concurrent instances or amount of time the diagnostics will be allowed to run.

When the diagnostic software is stored on the ROM 104 area of the USB device 100, and the USB device 100 is connected to the USB port 208 of the host computer 202, as depicted in FIG. 2A, for example, the diagnostic software can be used to interact with the peripherals attached to that host computer 202. In this situation, authentication is performed on the host computer 202 by having the host computer 202 run authentication programs that reside in both the ROM 104 area and hidden 105" area of the USB memory device 100 so that the authentication can be run which would control whether or not the diagnostic software will be allowed to run. As area 105" is hidden and encrypted, it provides critical configuration and validation information to insure that the USB memory device contains proper authentication information and is not some emulated or cloned device.

The diagnostic software can be copied to peripheral equipment of the host computer 202, such as a compact disk drive or hard drive 207, and run on the host computer 202. It can also reside on the ROM 104, read/write partition 106 or in the hidden partition 105. It may also be loaded directly from a remote computer over a network. The authentication described in FIG. 3A provides the flexibility to require that some or all of the diagnostic software must load from a specific location on the USB memory device.

Regardless of the source of the programs that are loaded into the CPU to be executed, an authentication and identification program, which will include a requirement of detection of the connection of the specific USB device 100 that stores the authentication and identification protocols, will be stored in the ROM 104, and configured by parameters in hidden 105. Authentication to run the diagnostic software is performed on the host computer 202 by having the computer directly query the ROM 104 area of the USB memory device 100 for the authentication and identification programs, which will include a requirement of detection of the connection of the specific USB device 100 by means of executing the authentication and identification protocol software. Information in hidden area 105" contains additional encryption/decryption data that is keyed to the unique serial number(s) and identification strings burned in area 102 by the manufacturer of the USB memory.

Figure 3B:
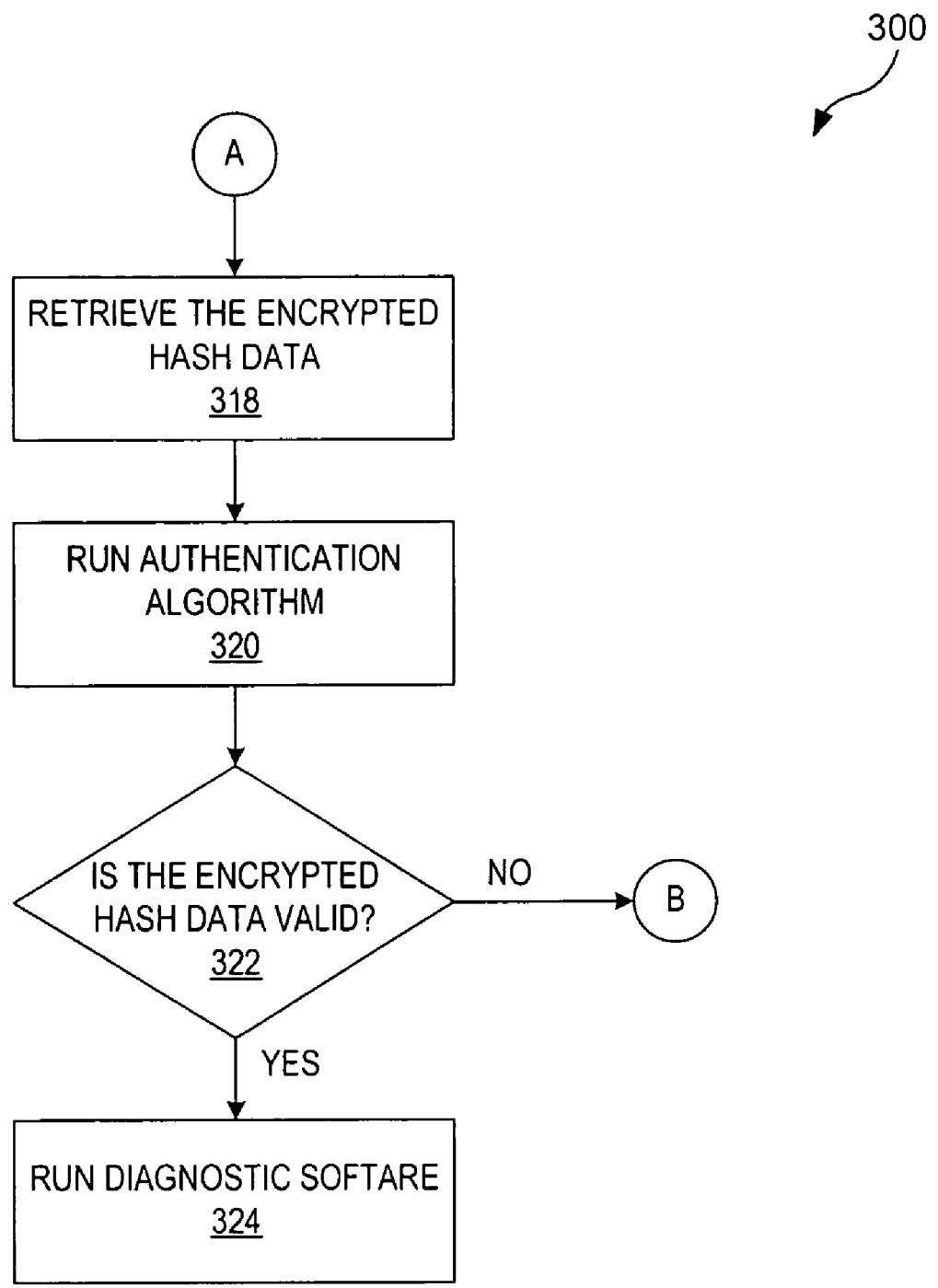

Referring to FIG. 3 of the drawings, the reference numeral 300 generally designates the operation of the secured diagnostic software. To use the secured diagnostic software, a user (such as an authorized expert technician) inserts the USB memory device into a USB port of either the host computer 202 (FIG. 2A) or an authentication computer 222 (FIG. 2B) such as the technician's computer, an office computer or laptop computer.

The USB device interfaces the host computer 202 or authorization computer 222 in step 302. During the interface, the USB device is powered up and hardware/software power-up protocols are initiated. Since USB devices are hot-pluggable, there typically is not a need to restart the computer with the USB engaged. Thus, the USB device can be coupled to the computer during operation with little risk of malfunction.

Once interfaced, the computer launches an authentication program which is resident on the USB device. The USB device may be configured to auto-launch this process provided it is plugged into a host computer running the appropriate operating system. A determination is made in step 304 as to whether the diagnostic software should authenticate itself against keys and serial numbers located on another medium, such as a CDROM or Hard Disk Drive vs. validating against the information located in partition 102, ROM 104, and hidden area 105". If valid licensing information is located on another medium, the authentication subroutine allows the diagnostic software to be loaded into the host computer's memory from the other medium in step 306 and executed. Otherwise, USB-specific authentication subroutines are loaded into the host computer's memory from the USB device in step 308.

Once loaded, the USB-specific authentication subroutine queries the USB device in step 310. The query allows the authentication program to gain access to the unique serial number and the identification string, and identification string. These pieces of information are permanently stored in the factory-programmed partition, such as the factory programmed partition 102 of FIG. 1, of the USB device. The USB device can also be queried periodically during the operation of the diagnostic software to determine if the USB device remains in communication with the computer during the entire diagnostic procedure.

When the unique serial number and the identification string are retrieved, their respective validities are checked in steps 312 and 316. If either the unique serial number or identification string is not valid, then the session is terminated in step 314.

Once the unique serial number and the identification string have been retrieved and determined to be valid, the encrypted hash data is retrieved in step 318. Typically, the hash data is an encrypted version of the unique serial number; however, the hash data can comprise other data. The encrypted hash data is stored in the programmable ROM, such as the programmable ROM 104 of FIG. 1.

After retrieving the encrypted hash data, the authentication program is run in step 320. Based on the valid unique serial number, identification string, and the encrypted hash data, the authentication algorithm determines if the hash data is valid in step 322. If the hash data is not valid then, the session is termination in step 314. However, if the hash data is valid, then the diagnostic software or tools are run in step 324.

Figure 4:
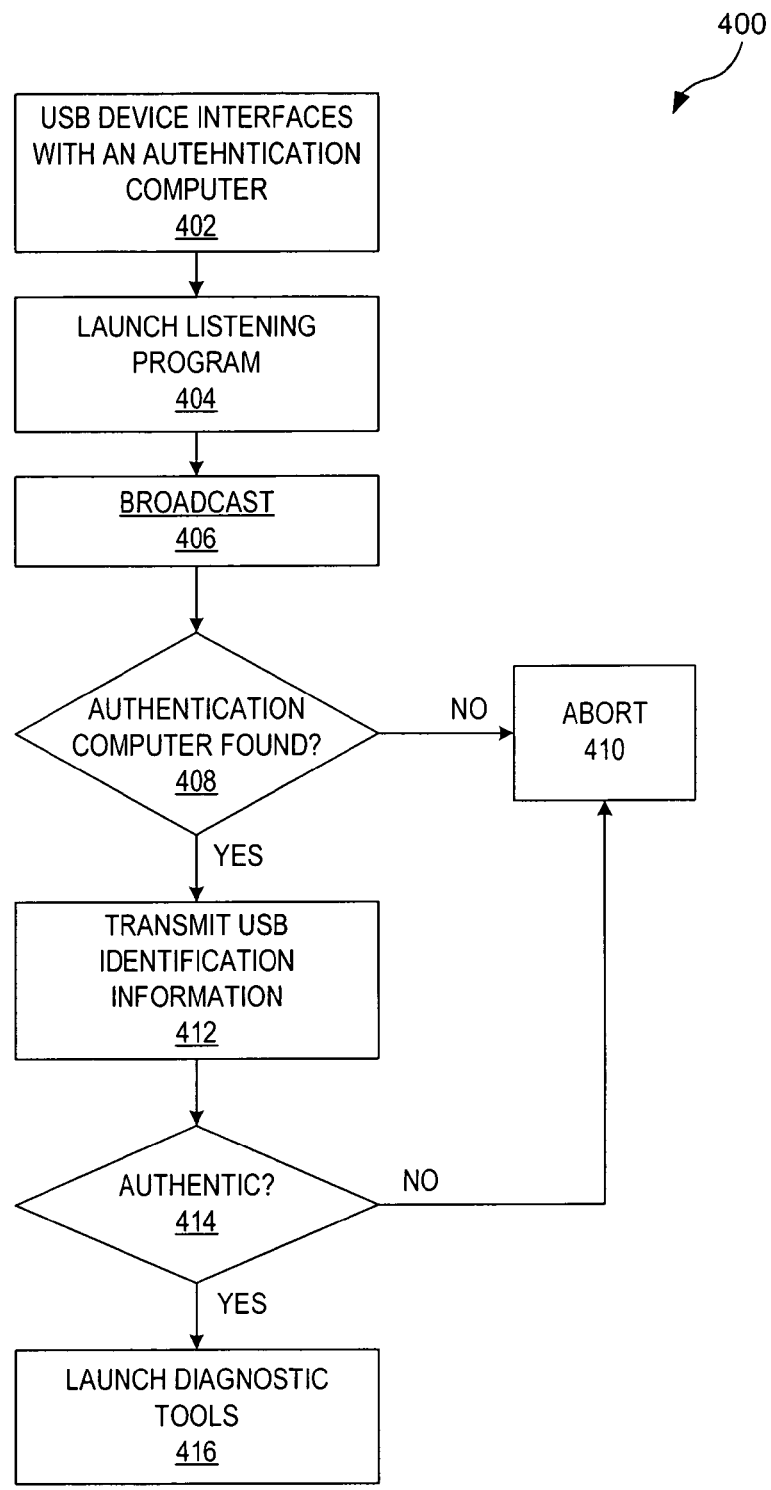
FIG. 4 depicts a flow chart of the operation of the secure USB device to enable loading and running of the diagnostic software with the configuration of FIG. 2B.

Referring to FIG. 2B and FIG. 4 of the drawings, the reference numeral 400 generally designates the operation of the secured diagnostic software to diagnose a host computer when the USB device 100 is connected to a remote authentication computer 222. When initiated, a user inserts the USB memory device into a USB port of the authentication computer 222. The USB device then interfaces the authentication computer is step 402. The authentication computer then launches a listening or authentication program in step 404. With the listening program, the remote computer will listen for an IP or User Datagram Protocol (UDP) traffic over a predetermined port number over a computer network, such as the computer network 212 that is in communication with the host computer.

A remote computer 203 then broadcasts information in step 406. During step 406, the remote computer 203 launches diagnostic services. If the authentication computer 222 is connected to a network that the remote computer 203 can also access, then, the remote computer 203 can supply the authentication computer with TCP/IP number, such as a network address, or the remote computer 203 can attempt to discover the authentication computer 222 through broadcast and multicast protocols.

During the broadcast the authentication computer 222 must be found. A determination is made in step 408 as to whether the authentication computer 222 has been found. If the authentication computer 222 has been found, then the USB identification information is transmitted to the host computer in step 412. In addition, as the network may not be secure, additional encryption may be incorporated into this exchange. The encryption keys must be known to both the remote 203 and authentication computer 222, and should be changed often. If the authention computer 222 has not been found, or data can not be decrypted, then the process is aborted in step 410.

Once the remote computer 203 has the required authentication data read from the USB memory, then the authentication computer 222 can be authenticated in step 414. That is, the presence of the authorized USB device 100 is detected on USB port 209 attached to authentication computer 222. If the USB identification information is not correct, then the process is aborted. However, if correct, then the diagnostic software is launched and allowed to run given any constraints or settings defined by typically the hidden partition 105" of the USB memory device.

Use of a separate authentication computer, whether remote or local, is useful when the host computer remote system doesn't have a USB port. It is also useful if the host computer operating system does not support USB. For example, SGI's IRIX operating system has a USB port, but it is for keyboard/mouse only. The operating system does not understand the concept of a USB flash memory device and there are no drivers for this. Thus, without use of the separate authentication computer, the engineer would be forced to copy the diagnostic software onto the host computer for the duration of running the diagnostic software, which would pose a risk of future unauthorized copying or use of the diagnostic software.

Furthermore, use of a separate authentication computer 222, connected via the internet to the remote computer that will run the diagnostics, is useful where it is desired to perform off-site debugging of remote computer 203 perhaps for demo or training purposes, or just to save the time/expense of travel. In this case, the engineer can email the diagnostic software (including the secure authentication subroutines) tailored to the specific operation system (IRIX, for example) to the customer's location. While the engineer (at a remote location) has the USB memory device plugged into his or her authentication computer 222, the customer can then launch the program on the remote computer 203, which will tell the program the preset network (or internet address) of the engineer's PC or website that has the USB memory device 100 that is running the licensing services. Then, the authentication computer 222 and the remote computer 203 hookup and negotiate permissions, then the engineer more or less takes control of the session, runs commands as necessary, and sees results as they happen at his system. All data is generally encrypted, and both the engineer using the authentication computer 222 and the customer at the remote computer 203 must have already agreed on a common password. That way nothing happens without both parties agreeing to the exchange.

It should be noted that his client/server authentication-logging mechanism can be operating system agnostic. The licensing system will typically be windows, LINUX, or OS X, while the remote system can be any operating system.

It should also be noted that the diagnostic software cannot only be run on a traditional computer, but the software could also be a program that might run on a USB port that might appear directly on a peripheral device, such as a hard drive or an external RAID storage array.

It should be noted that the USB memory device is not functioning as a type of authentication-only dongle. Either the diagnostic software or authentication programs required to load the diagnostic software on computing devices are also loaded on the USB stick. By contrast, in the case of an authentication-only dongle, only an authentication code is stored on the dongle. Thus, with an authentication-only dongle, all a sophisticated computer expert needs to do to defeat the anti-copy protections is to extract the authentication code from the dongle, or to change the authentication code that the diagnostic software is looking for.

In summary, the invention makes use of secure USB memory devices that have unique identification fields burned into them that are unique to each individual memory stick and are not alterable.

The computers to which the present invention are applicable include personal computers are not necessarily personal computers. They can be any computing hardware architecture that needs to run diagnostic software. In fact, in general, most of these systems will be larger server type, rather then personal computers, and they will usually be running a UNIX variant. This is not, however, a requirement of the invention.

The diagnostic software is not necessarily a single program nor is it a program specifically to run test reports. The software can be a plurality of programs that run interactively and/or comprise stored procedures. The programs can be used to flash firmware images or reconfigure storage subsystems.

Therefore, the system of the invention can employ a special USB flash memory device that contains unique, permanent identification information and hardware-protected versions of diagnostic programs that will not run unless the specific memory device authorized to store that diagnostic software can be "seen" by the host computer that will run these diagnostics. As the USB memory stick is portable, fast, and can be configured to hold both programs and read/write partitions for resulting diagnostic data, they are a most convenient media device for storage engineers.

By adding logic that effectively couples the diagnostic programs with the secure solid-state device, there is no risk that the engineer will copy programs to multiple host computers without authorization. Any diagnostic software that is copied from the USB device will check for authentication via the vendor-unique and protected commands to reserved and protected areas on the USB stick for appropriate validation information. If the executable does not detect proper serialization information (because, for example, the diagnostic software has been copied onto a floppy disk) then the executable will not run, or perform some other task such as terminating with an appropriate error message.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A device for securing and enabling authorized operation of diagnostic software to diagnose computer storage-related equipment running on a host computer having an operating system pre-installed, comprising:
a removable solid-state memory device having an end-user-accessible first read-only reserved area that is at least configured to contain a unique and unchangeable identification sequence;
a second area in said solid-state memory device containing said diagnostic software, said diagnostic software being configured for operation on said operating system to diagnose said computer storage-related equipment while said host computer is operating using said pre-installed operating system and for a limited period without reauthentication with the memory device; and
a hidden partition, that is in-accessible to a user for reading or writing without special commands not readily available to the end-user and without entry of a password unknown to the end-user, said hidden partition having stored therein at least an encrypted version of the unique identification sequence to enable operation of diagnostic software only when the specific memory device having the unique and unchangeable identification sequence has been inserted into a communication port of either the host computer or a separate authentication computer in communication with the host computer.

2. The device of claim 1, wherein the communication port is a USB port.

3. The device of claim 1, wherein the memory device further comprises a user-accessible read/write partition configured to at least store information resulting from use of the diagnostic software to diagnose equipment running on said host computer.

4. The device of claim 1, wherein the hidden partition is at least configured to contain an authentication protocol to enable operation of the diagnostic software only when the specific memory device having the unique and unchangeable identification sequence is inserted into a communication port of a computer.

5. A method for securing and enabling authorized operation of diagnostic software for diagnosing computer storage-related equipment running on a computer having an operating system pre-installed, comprising:
interfacing a removable solid-state memory device with a computer, wherein the memory device is at least configured to have
an end-user-accessible first read-only reserved area that is at least configured to contain a unique and unchangeable identification sequence;
a second area in said solid-state memory device containing said diagnostic software, said diagnostic software being configured to operate on said operating system and
a hidden partition, that is in-accessible to an end-user for reading or writing without special commands not readily available to the end-user and without entry of a password unknown to the end-user;
storing in said hidden partition at least an encrypted version of the unique identification sequence to enable operation of diagnostic software only when the specific memory device having the unique and unchangeable identification sequence has been inserted into a communication port of a computer; and
retrieving the unique identification sequence from the first read-only reserved area;
retrieving the encrypted version of the unique identification sequence from the hidden partition;
authenticating the memory device by comparing the unique identification sequence with the encrypted version thereof; and
enabling operation of the said at least one diagnostic software only if the memory device is authenticated to diagnose said computer storage-related equipment while said host computer is operating using said pre-installed operating system and for a limited period without reauthentication with the memory device.

6. The method of claim 5, wherein the method further comprises:
storing the diagnostic software in the hidden partition; and
retrieving the diagnostic software from hidden partition if the memory device is authenticated.

7. The method of claim 5, wherein the unique identification sequence includes a serial number and information correlating to the memory device vendor.

8. The method of claim 5, wherein the method further comprises:
connecting the memory device to an authentication computer;
connecting the authentication computer to a host computer over a computer network; and
broadcasting the plurality of identification sequences and the encrypted version of the identification sequences to the host computer.

9. An apparatus for securing and enabling diagnostic software for diagnosing computer storage-related equipment running on a computer system having an operating system pre-installed, comprising:
means for interfacing a removable solid-state memory device with a computer, wherein the memory device is at least configured to have
an end-user-accessible first read-only reserved area that is at least configured to contain a unique and unchangeable identification sequence and
a hidden partition, that is in-accessible to a user for reading or writing without special commands not readily available to the end-user and without entry of a password unknown to the end-user;
a second area in said solid-state memory device containing said diagnostic software, said diagnostic software being configured to operate on said operating system; and
means for storing in said hidden partition at least an encrypted version of the unique identification sequence to enable operation of diagnostic software only when the specific memory device having the unique and unchangeable identification sequence has been inserted into a communication port of a computer; and
means for retrieving the unique identification sequence from the first read-only reserved area;
means for retrieving the encrypted version of the unique identification sequence from the hidden partition;
means for authenticating the memory device by comparing the unique identification sequence with the encrypted version thereof; and
means for enabling operation of the at least one diagnostic software only if the memory device is authenticated to diagnose said computer storage-related equipment while said host computer is operating using said pre-installed operating system and for a limited period without reauthentication with the memory device.

10. The apparatus of claim 9, further comprising:
means for retrieving the diagnostic software from the hidden partition.

11. The apparatus of claim 9, wherein the unique identification sequence includes a serial number and information correlating to the memory device vendor.

12. The apparatus of claim 9, further comprising:
   means for connecting the memory device to an authentication computer;
   means for connecting the authentication computer to a host computer over a computer network; and
   means for broadcasting the plurality of identification sequence and the encrypted version of the identification sequence to the host computer.

13. A computer program product for securing diagnostic software for diagnosing computer storage-related equipment running on a computer system having an operating system pre-installed, the computer program having a medium with a computer program embodied thereon, the computer program comprising:
   computer code for interfacing a removable solid-state memory device with a computer, wherein the solid-state memory device is at least configured to have
      an end-user-accessible first read-only reserved area that is at least configured to contain a unique and unchangeable identification sequence and
      a hidden partition, that is in-accessible to a user for reading or writing without special commands not readily available to the end-user and without entry of a password unknown to the end-user;
   a second area in said solid-state memory device containing said computer diagnostic software, said diagnostic software being configured for operation on said operating system; and
   computer code for storing is said hidden partition at least an encrypted version of the unique identification sequence to enable operation of diagnostic software only when the specific memory device having the unique and unchangeable identification sequence has been inserted into a communication port of a computer; and
   computer code for retrieving the unique identification sequence from the first read-only reserved area;
   computer code for retrieving the encrypted version of the unique identification sequence from the hidden partition;
   computer code for authenticating the memory device by comparing the unique identification sequence with the encrypted version thereof; and
   computer code for enabling operation of the at least one diagnostic software only if the memory device is authenticated to diagnose said computer storage-related equipment while said host computer is operating using said pre-installed operating system and for a limited period without reauthentication with the memory device.

14. The computer program product of claim 13, further comprising computer code for retrieving the diagnostic software from the hidden partition.

15. The computer program product of claim 13, wherein the unique identification sequence includes a serial number and information correlating to the memory device vendor.

16. The computer program product of claim 13, further comprising:
   computer code for detecting connection of the memory device to an authentication computer;
   computer code for detecting connection of the authentication computer to a host computer over a computer network; and
   computer code for broadcasting the identification sequence and the encrypted version thereof to the host computer.

17. The computer program product of claim 13, wherein the computer program product further comprises:
   computer code for detecting connection of a host computer over a computer network; and
   computer code for broadcasting the identification sequence and the encrypted version thereof to the host computer.

18. The computer program product of claim 17, wherein the computer program product further comprises computer code for launching the diagnostic software from the host computer.

* * * * *